(12) United States Patent
Tazaki et al.

(10) Patent No.: US 7,686,490 B2
(45) Date of Patent: Mar. 30, 2010

(54) VEHICLE FRONT BODY STRUCTURE

(75) Inventors: Yuichi Tazaki, Ebina (JP); Takehiro Kiuchi, Atsugi (JP); Shinichi Kaneda, Fujisawa (JP); Tatsuya Yamaho, Sagamihara (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 546 days.

(21) Appl. No.: 11/047,676

(22) Filed: Feb. 2, 2005

(65) Prior Publication Data

US 2005/0174795 A1      Aug. 11, 2005

(30) Foreign Application Priority Data

Feb. 6, 2004      (JP)  ............................. P2004-030569

(51) Int. Cl.
*F21S 8/10* (2006.01)

(52) U.S. Cl. .................... 362/546; 362/523; 362/549

(58) Field of Classification Search ............... 362/546, 362/507, 538, 362, 418, 419, 427, 523, 549, 362/652, 457, 458; 296/193.09, 203.02
See application file for complete search history.

(56) References Cited

U.S. PATENT DOCUMENTS

| | | | | |
|---|---|---|---|---|
| 2,749,434 A * | 6/1956 | Falge | ........................... | 362/546 |
| 3,814,928 A | 6/1974 | Grosseau | | |
| 6,799,871 B2 * | 10/2004 | Shin | ........................... | 362/362 |
| 7,338,191 B2 * | 3/2008 | Konno et al. | ................. | 362/507 |
| 2002/0122311 A1 * | 9/2002 | Iwase | ........................ | 362/520 |

FOREIGN PATENT DOCUMENTS

| | | |
|---|---|---|
| DE | 195 11 137 C1 | 3/1996 |
| DE | 203 14 383 U1 | 12/2003 |
| EP | 1 024 075 A1 | 8/2000 |
| JP | 09-132079 | 5/1997 |
| JP | 2001-047934 | 2/2001 |
| JP | 2002-079877 | 3/2002 |
| JP | 2003-267123 | 9/2003 |
| WO | WO 03/076229 A1 | 9/2003 |

OTHER PUBLICATIONS

European Search Report issued in corresponding European Patent Application No. 05250554.2-2423, dated Feb. 23, 2007.
Japanese Notification of Reasons for Refusal, w/ English translation thereof, issued in Japanese Patent Application No. JP 2004-030569 dated Feb. 17, 2009.

* cited by examiner

*Primary Examiner*—Sharon E Payne
(74) *Attorney, Agent, or Firm*—McDermott Will & Emery LLP

(57) ABSTRACT

A vehicle front body structure including a front end module attached to a body front end. The front end module includes a frame member and a headlamp unit supported on the frame member. The headlamp unit is provided with a mounting device which is configured to flexibly support the headlamp unit on the frame member, and to provide a tendency to move the headlamp unit to its attachment position, upon application of a force exceeding a predetermined threshold to the headlamp unit.

6 Claims, 4 Drawing Sheets

VEHICLE FRONT BODY STRUCTURE

BACKGROUND OF THE INVENTION

1. Field of the Invention

The present invention relates to a vehicle front body structure, particularly to a structure for obtaining a uniform gap of a predetermined size between a headlamp unit of a front end module and a front fender at assembly.

2. Description of Related Art

In vehicle body manufacturing process, a front end module including a radiator support and headlamp units and the like mounted thereon is sub-assembled in a sub-assembly line, and fed to a main assembly line to be mounted on to a body flowing therethrough. In this mounting process, a gap between the headlamp unit of the front end module and a front fender of the body is adjusted to a predetermined size.

Japanese Patent Application Laid-Open Publication No. 2003-267123 discloses a mounting structure of a headlamp unit allowing a screw adjustment of a gap between the headlamp unit and a front fender, providing inclined slidable contact faces on a projected portion of the headlamp unit housing and on an attachment portion of a radiator support.

SUMMARY OF THE INVENTION

However, in the mounting structure described above, it is difficult to obtain a uniform and constant gap between the headlamp unit and the front fender. If fastening torque of the screw is too large, the headlamp unit becomes so close to the front fender that the headlamp unit may interfere with the front fender. Meanwhile, if the fastening torque of the screw is too small, the gap between the headlamp unit and the front fender may become too large.

It is an object of the present invention to provide a vehicle front body structure which enables to obtain a uniform gap of a predetermined size between the headlamp unit and the front fender, and provides an easy mounting of the headlamp unit.

An aspect of the present invention is a vehicle front body structure comprising a front end module attached to a body front end, the front end module including a frame member and a headlamp unit supported on the frame member, wherein the headlamp unit is provided with a mounting device which is configured to flexibly support the headlamp unit on the frame member, and to provide a tendency to move the headlamp unit to its attachment position, upon application of a force exceeding a predetermined threshold to the headlamp unit.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
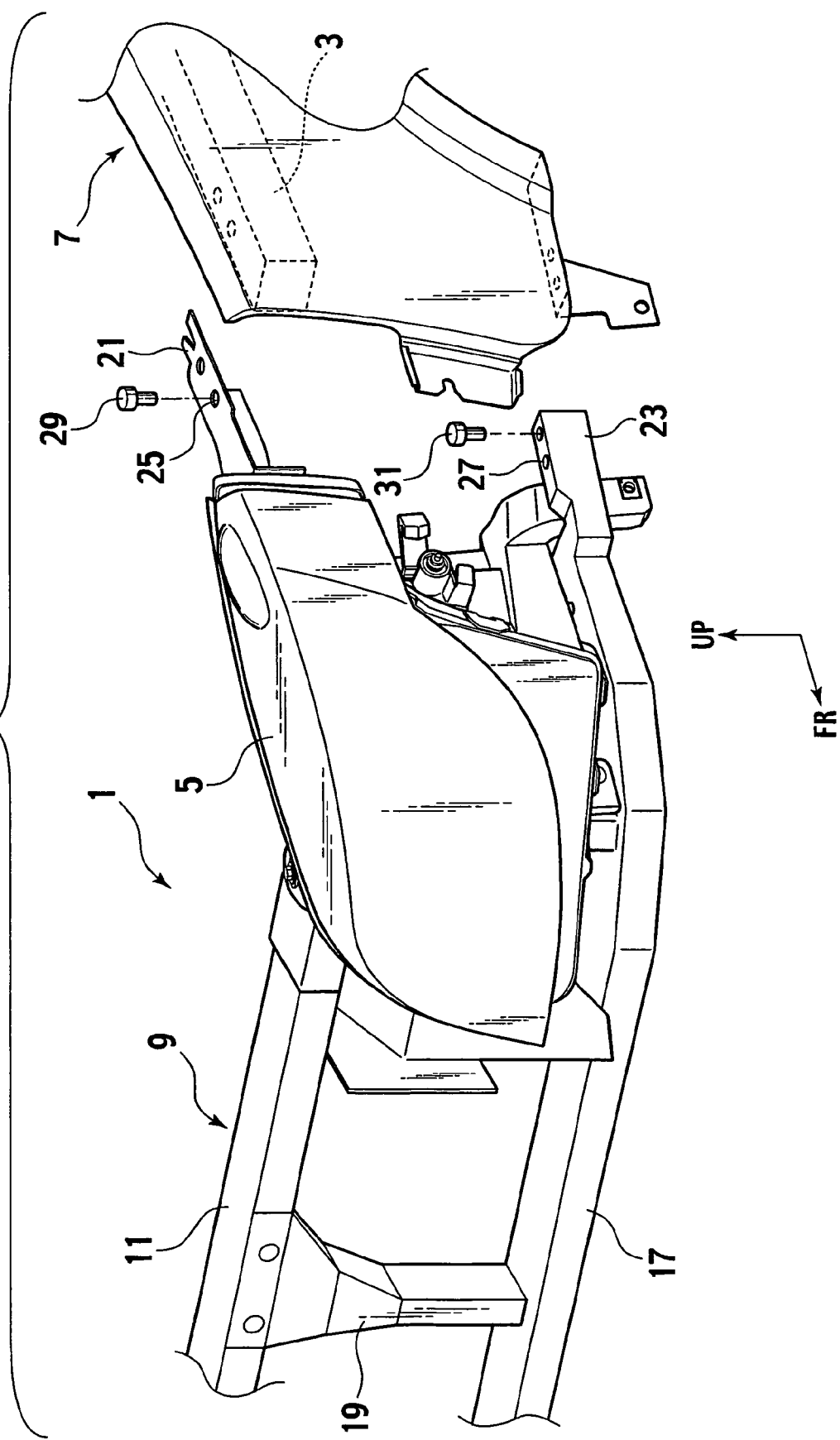
FIG. 1 is an exploded perspective view of a vehicle front body structure according to an embodiment of the present invention.

An embodiment of the present invention will be explained below with reference to the drawings, wherein like members are designated by like reference characters.

As shown in FIG. 1, a front end module 1 to which a headlamp unit 5 is mounted on is connected to a hood ledge member 3 and a front fender 7 in a body front end.

The front end module 1 includes a radiator support 9 extending in a vehicle transverse direction as a frame member of the front end module, and a pair of headlamp units 5 supported on both of the transversely outer sides of the radiator support 9. This radiator support 9 constitutes a structural frame member of the body front end. The radiator support 9 has an upper rail 11 extending in the vehicle transverse direction on an upper portion thereof, and on a lower portion thereof, an armature portion 17 substantially parallel to the upper rail 11. These upper rail 11 and armature portion 17 are connected with each other by vertical hood lock stays 19 therebetween.

Figure 2:
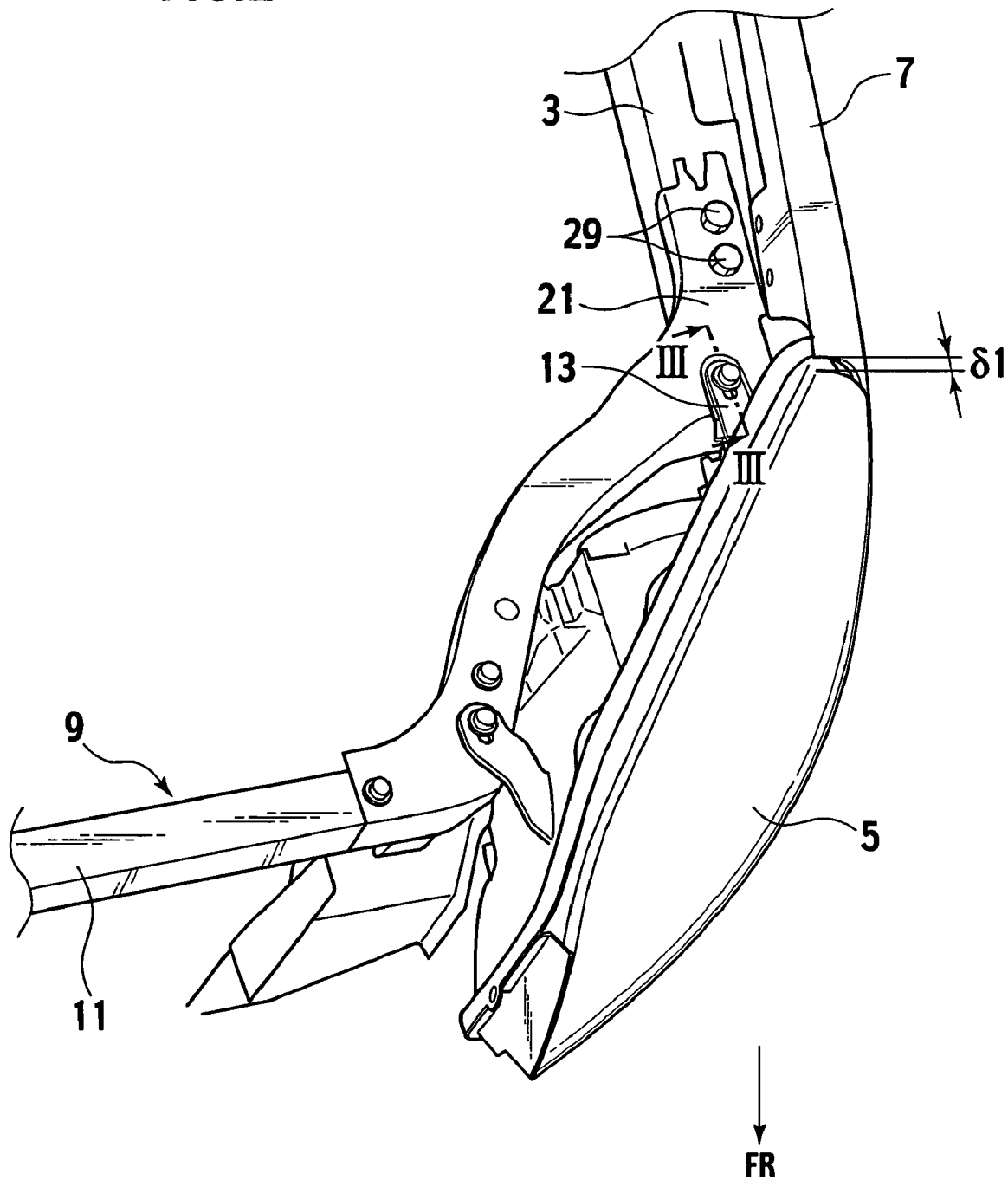
FIG. 2 is a perspective view of the vehicle body front structure according to the embodiment of the present invention, viewed from obliquely above, in which a front end module is bolt-fastened to a hood ledge member, and a headlamp unit is temporarily supported on a frame member of the front end module.

On each of the transversely outer sides of the front end module 1, an upper attachment piece 21 is extended rearward from an upper end thereof, and a lower attachment block 23 is extended rearward from a lower end thereof. Bolt holes 25 and 27 are provided through the upper attachment piece 21 and lower attachment block 23, respectively. As shown in FIGS. 1 and 2, the upper attachment piece 21 is put on an upper face of the hood ledge member 3 and fastened thereto with bolts 29 inserted through the bolt holes 25, and the lower attachment block 23 is placed on a lower front end of the front fender 7 and fastened thereto with bolts 31 inserted through the bolt holes 27. The front end module 1 is thus mounted on to the vehicle body. In this state, the headlamp unit 5 is supported in a position in front of the front fender 7, with a gap of a predetermined size $\delta_1$ provided between the front fender 7 and headlamp unit 5.

Figure 3:
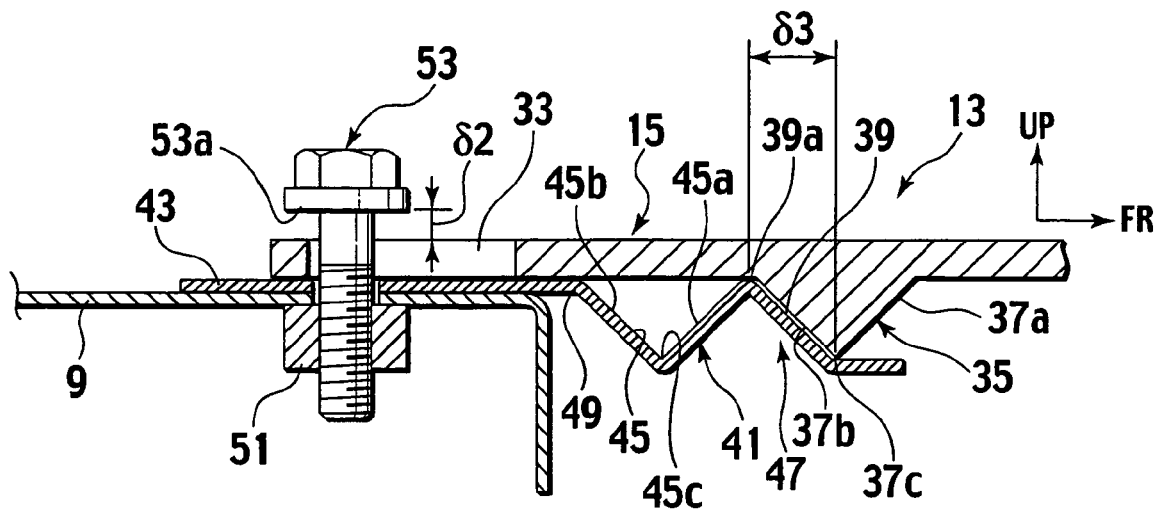
FIG. 3 is an enlarged cross-sectional view of an attachment portion of the headlamp unit taken along a line III-III of FIG. 2.

Moreover, as shown in FIGS. 2 and 3, the headlamp unit 5 is flexibly supported on the front end module 1 by a support piece 15 and an elastic member 41, which collectively constitute a mounting device 13, provided on a rear side of the headlamp unit 5.

The support piece 15 is extended rearward from a rear side of the headlamp unit 5. The support piece 15 is provided on a rear portion thereof with a slotted hole 33 extending along a longitudinal direction thereof. The support piece 15 is formed to have, on a lower side of the support piece 15, a convex portion 35 protruding downward, which has an inclined face 37*a* facing frontward (whose normal vector has a frontward component), an inclined face 37*b* facing rearward (whose normal vector has a rearward component), and a ridge portion 37*c* where these inclined faces intersect with each other. Specifically, the convex portion 35 is formed into a substantially triangular shape in a vertical cross section parallel to the longitudinal direction of the support piece 15, whose width in the longitudinal direction thereof becomes narrower as it goes downward.

The elastic member 41 is fixed to an upper face of an upper corner portion of the radiator support 9. The elastic member 41 is arranged under the support piece 15, and has a base portion 43 set on the upper face of the radiator support 9, and an elastic portion 47 extended frontward from the base portion 43. The elastic portion 47 is formed into a substantially triangular wave shape in a vertical cross section parallel to the body longitudinal direction. The elastic portion 47 is formed to have, in a rear base portion thereof, a V-shaped concave portion 45 open upward, which has an inclined face 45*a* facing rearward (whose normal vector has a rearward component), an inclined face 45*b* facing frontward (whose normal vector has a frontward component), and a valley line portion 45*c* where these inclined faces intersect with each other. This concave portion 45 is engaged with the convex portion 35 of the support piece 15. Further, the elastic member 41 is formed to have, on a distal end side portion in front of the concave portion 45, an inclined face 39 facing frontward, and a ridge portion 39*a* where the inclined face 39 and the inclined face 45*a* intersect with each other. The elastic member 41 is a spring plate formed to be elastically deformable in a vertical direction. Specifically, the elastic portion 47 swings in the vertical direction about a support point 49 between the base portion 43 and the elastic portion 47.

A procedure for mounting the front end module 1 described above on to the body will be described.

First, as shown in FIG. 2, both left-and-right ends of the front end module 1 are attached to the hood ledge member 3 and the front fender 7. Specifically, as shown in FIG. 1, the upper attachment piece 21 of the front end module 1 is fastened to the hood ledge member 3 with the bolts 29, and the lower attachment block 23 is fastened to the lower front end of the front fender 7 with the bolts 31. At this time, as shown in FIG. 3, a bolt 53 for attachment of the headlamp unit 5 is not completely tightened or screwed into a nut 51 which is welded to a rear side of the radiator support 9, and a bottom face 53*a* of a head of the bolt 53 is arranged above an upper face of the support piece 15 with a predetermined space interval $\delta_2$ therebetween.

The support piece 15 of the headlamp unit 5 is thus put on an upper face of the elastic member 41 which is fastened to the radiator support 9, and the headlamp unit 5 is temporarily supported so as to be movable in the longitudinal direction of the support piece 15, or in the vehicle longitudinal direction. At this time, the convex portion 35 of the support piece 15 is set in a position in front of the concave portion 45 on the upper face of the elastic member 41, with the inclined face 37*b* facing rearward thereof being in contact with the frontward-facing inclined face 39 of the elastic member 41, so that the headlamp unit 5 can move rearward relative to the front end module 1, when a thrust equal to or more than a predetermined threshold is applied rearward to the headlamp unit 5.

Figure 4:
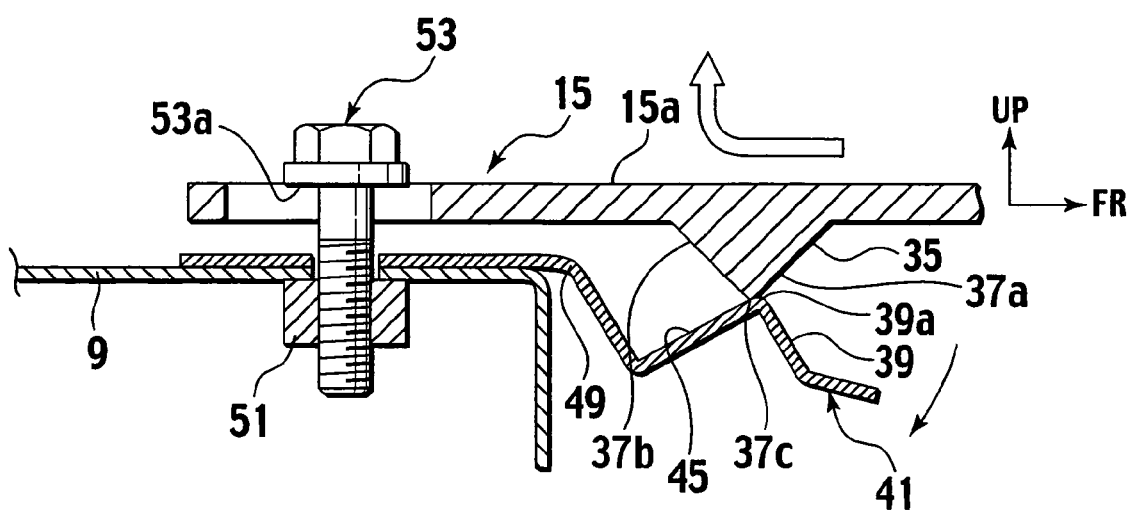
FIG. 4 is an enlarged cross-sectional view of the attachment portion of the headlamp unit, showing a state where the headlamp unit is being moved rearward relative to the front end module.

Subsequently, as shown in FIG. 4, when the headlamp unit 5 is pushed rearward, the support piece 15 thereof moves rearward relative to the elastic member 41, and the convex portion 35 of the support piece 15 ascends along the inclined face 39 of the elastic member 41, whereby the support piece 15 is pushed up by the elastic member 41 and moves upward, and the elastic member 41 is elastically deformed downward (in a direction shown by a solid arrow in FIG. 4). Then, the support piece 15 is lifted up and an upper face 15*a* thereof reaches a height of the bottom face 53*a* of the bolt head. Specifically, as shown by an arrow of FIG. 4, the headlamp unit 5 moves upward while moving rearward.

Figure 5:
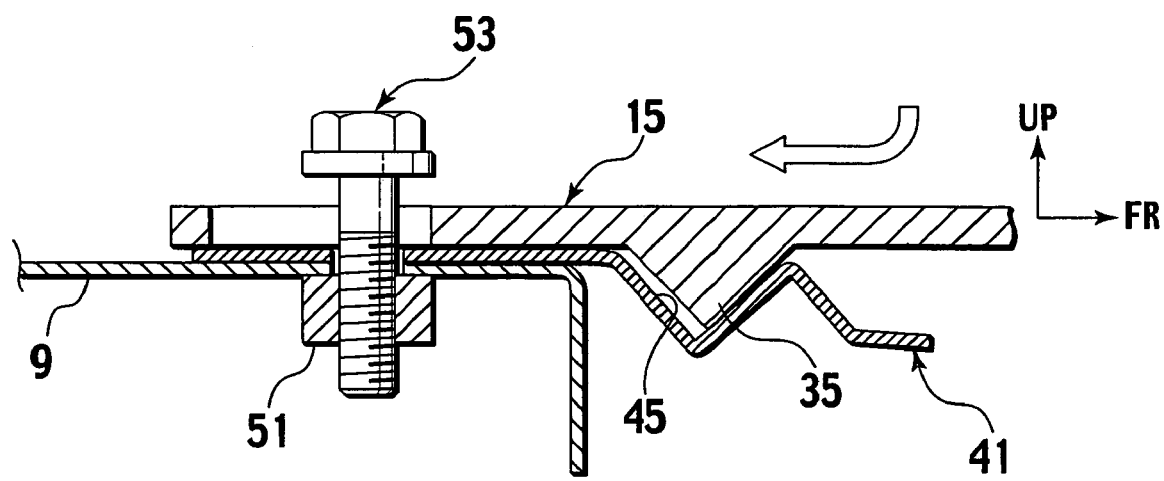
FIG. 5 is an enlarged cross-sectional view of the attachment portion of the headlamp unit, showing a state where the headlamp unit has moved to an attachment position thereof.
Figure 6:
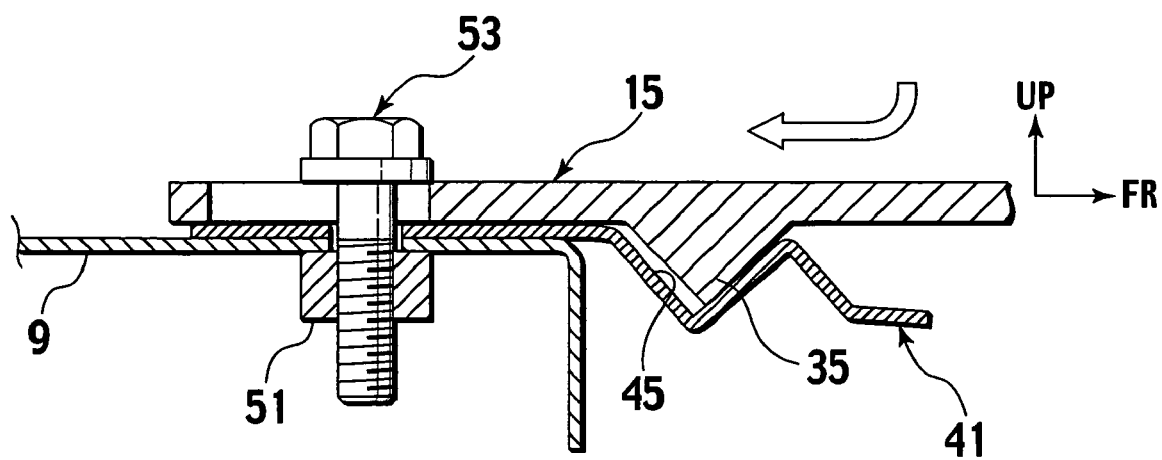
FIG. 6 is an enlarged cross-sectional view showing a state where the headlamp is fastened to the frame member of the front end module with a bolt.

Thereafter, the headlamp unit 5 is further pressed rearward. Then, as shown in FIG. 5, the convex portion 35 of the support piece 15 comes in engagement with the concave portion 45 formed on the base side of the elastic member 41 of the ridge portion 39*a*, and the headlamp unit 5 is prevented from moving rearward any further. As shown in FIG. 6, even if the convex portion 35 is not completely received in or engaged with the concave portion 45 and the support piece 15 is in a floated condition above the attachment portion of the radiator support 9, the support piece 15 can be pressed against the elastic member 41 and given a rearward thrust by tightening the bolt 53. Then, the inclined face 37*a* or ridge portion 37*c* of the convex portion 35 slides down on the inclined face 45*a* of the concave portion 45 of the elastic member 41. Accordingly, the headlamp unit 5 further moves rearward. Specifically, as shown by an arrow of FIG. 5, the headlamp unit 5 moves downward while moving rearward.

Functions and effects of the embodiment of the present invention will be described below.

The mounting device 13 described above includes the support piece 15 which is provided on the rear side of the headlamp unit 5 and has the convex portion 35 protruded thereon, and the elastic member 41 which is provided on the radiator support 9 and has the concave portion 45 to be engaged with the convex portion 35 of the support piece 15. These convex portion 35 and concave portion 45 are formed to engage with each other, thus securing the headlamp unit 5 to the radiator support 9. Moreover, the convex portion 35 includes the inclined faces 37*a* and 37*b*, and the concave portion 45 includes the inclined faces 45*a*, 45*b* and 39. Therefore, when the headlamp unit 5 is pressed rearward, the ridge portion 37*c* of the convex portion 35 of the support piece 15 ascends along the inclined face 39 of the elastic member 41, and climbs over the ridge portion 39*a* thereof. After the headlamp unit 5 is moved rearward by a predetermined amount $\delta_3$ relative to the radiator support 9, the convex portion 35 of the support piece 15 slides down along the inclined face 45*a* of the concave portion 45 of the elastic member 41. This sliding motion provides the headlamp unit 5 with the rearward thrust. In such a way, mounting work of the headlamp unit 5 is performed efficiently.

The convex portion 35 of the support piece 15 is formed into the substantially triangular shape in cross section. Moreover, the concave portion 45 of the elastic member 41 is formed into the substantial V shape in cross section. Accordingly, the headlamp unit 5 is given a rearward thrust smoothly, and the mounting work of the headlamp unit 5 is performed more efficiently.

The elastic member 41 is the spring plate formed to be elastically deformable in a vertical direction or in a direction substantially orthogonal to a direction of the rearward movement of the headlamp unit 5 toward the attachment position thereof, and the support piece 15 of the headlamp unit 5 is flexibly supported on the elastic member 41. Accordingly, the gap between the headlamp unit 5 and the front fender 7 can be constantly set to a predetermined size. Moreover, even when the headlamp unit 5 is put in a position in the rear of the attachment position thereof, the rearward-facing inclined face 37*b* of the convex portion 35 of the support piece 15 slides down along the frontward-facing inclined face 45*b* of the concave portion 45 of the elastic member 41, while the elastic member 41 recovers its original shape, and thus the position of the headlamp unit 5 is automatically adjusted. Accordingly, interference between the headlamp unit 5 and the front fender 7 can be prevented, thus eliminating scratches of the front fender 7. Furthermore, the headlamp unit 5 can be given a rearward thrust by the spring force of the elastic member 41, whereby the mounting work of the headlamp unit 5 can be performed efficiently.

Furthermore, by tightening the bolt 53 for fastening the support piece 15 of the headlamp unit 5 to the elastic member 41 of the radiator support 9, the headlamp unit 5 is further moved rearward to its final attachment position, thus reducing the variations in the attachment position of the headlamp 5 depending on workers. Even in the case that the headlamp unit 5 is pushed too much to the rear side, the headlamp unit 5 can be returned to the final attachment position thereof, using the spring force of the elastic member 41 and the fastening force of the bolt 53, whereby the gap between the headlamp unit 5 and the front fender 7 is adjusted to a predetermined size.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-030569, filed on Feb. 6, 2004, the disclosure of which is expressly incorporated herein by reference in its entirety.

What is claimed is:

1. A vehicle front body structure comprising:
   a front end module attached to a body front end, the front end module including a frame member and a headlamp unit supported on the frame member, the headlamp unit being an integrated assembly including at least a reflector housing and a lens, wherein
   the headlamp unit is provided with a mounting device which flexibly holds the headlamp unit in a temporary position on the frame member, and causes displacement of the headlamp unit in a direction from the temporary position to its attachment position relative to the frame member by exerting a resilient force against the headlamp unit in a direction crossing the direction of the displacement, upon application of a force exceeding a predetermined threshold to the headlamp unit, and
   the mounting device comprises:
      a support piece provided on the headlamp unit, the support piece having a convex portion formed thereon;
      an elastic member provided on the frame member, the elastic member having thereon a concave portion to be engaged with the convex portion, at least one of the convex portion of the support piece and the concave portion of the elastic member is formed to have an inclined face to be brought into sliding contact with the other of the convex portion of the support piece and the concave portion of the elastic member; and
      a fastener member provided through the support piece and adapted to press the convex portion of the support piece against the concave portion of the elastic member.

2. The vehicle front body structure according to claim 1, wherein
   the convex portion of the support piece is formed into a triangular shape in section, and the concave portion of the elastic member is formed into a "V" shape in section.

3. The vehicle front body structure according to claim 1, wherein
   the elastic member comprises a spring plate elastically deformable in a direction substantially orthogonal to a direction of the movement of the headlamp unit toward the attachment position thereof.

4. A vehicle front body structure comprising:
   a front end module attached to a body front end, the front end module including a frame member and a headlamp unit supported on the frame member, the headlamp unit being an integrated assembly including at least a reflector housing and a lens, wherein
   the headlamp unit is provided with a mounting device which flexibly holds the headlamp unit in a temporary position on the frame member, and generates a resilient force to cause displacement of the headlamp unit from the temporary position to its attachment position relative to the frame member, when a force exceeding a predetermined threshold is applied to the headlamp unit, and
   the mounting device comprises:
      a support piece provided on the headlamp unit, the support piece having a convex portion formed thereon;
      an elastic member provided on the frame member, the elastic member having thereon a concave portion to be engaged with the convex portion, at least one of the convex portion of the support piece and the concave portion of the elastic member being formed to have an inclined face to be brought into sliding contact with the other of the convex portion of the support piece and the concave portion of the elastic member; and
      a fastener member provided through the support piece and adapted to press the convex portion of the support piece against the concave portion of the elastic member.

5. The vehicle front body structure according to claim 1, wherein
   the convex portion of the support piece is formed into a triangular shape in section, and the concave portion of the elastic member is formed into a V shape in section.

6. The vehicle front body structure according to claim 1, wherein
   the elastic member comprises a spring plate elastically deformable in a direction substantially orthogonal to a direction of the movement of the headlamp unit toward the attachment position thereof.

* * * * *